United States Patent Office 2,996,545
Patented Aug. 15, 1961

2,996,545
OPTICAL RESOLUTION OF ALPHA-(ALPHA-NAPHTHYL)ETHYLAMINE

Robert R. Bottoms, Crestwood, Ky., assignor to Chemetron Corporation, Chicago, Ill., a corporation of Delaware
No Drawing. Filed Aug. 5, 1957, Ser. No. 676,369
4 Claims. (Cl. 260—570.8)

This invention relates to the optical resolution of alpha-(alpha-naphthyl)ethylamine. More particularly the invention relates to a method of resolving racemic alpha-(alpha-naphthyl)-ethylamine into its enantiomorphs by means of d-tartaric acid.

This application is a continuation-in-part of my copending application Serial No. 502,515, filed April 19, 1955 (now abandoned).

Alpha-(alpha-naphthyl)ethylamine has the following general formula:

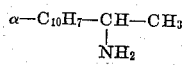

It contains an asymmetric carbon atom, and can exist in two optically active forms as well as one racemic form.

The two optically active forms of alpha-(alpha-naphthyl)ethylamine are useful resolving agents for the conversion of racemic acidic materials into their enantiomorphs. d-Alpha-(alpha-naphthyl)ethylamine is particularly valuable for this purpose, especially in connection with the resolution of dl-menthyl hydrogen phthalate in the production of synthetic l-menthol, as disclosed in my copending application Serial No. 502,514, filed April 19, 1955. The corresponding l-amine is a valuable resolving agent for acyl derivatives of amino acids in the production of synthetic amino acids identical to those found in nature.

The resolution of racemic amines has heretofore been a tedious, expensive, and unsatisfactory process. The complete resolution of racemic amines by means of d-tartaric acid has heretofore proven to be difficult and expensive despite the low cost of the d-tartaric acid and there are few recorded instances where such attempts have been successful. l-Malic acid has been proposed as a particularly useful acid in the resolution of racemic amines, but it has been found in the case of alpha-(alpha-naphthyl)-ethylamine that this acid is unsatisfactory in several particulars. In the first place, it is expensive, its recovery for re-use is difficult and the losses of material are high. Furthermore, the purification of amine l-malates is tedious, expensive and never quite complete, with the result that only the partially resolved amines are obtained.

The present state of the art of resolving racemic amines is not well defined and the extent and limitations in the use of resolving agents are not sufficiently well known for one to be able to predict the behavior of a new compound from its physical properties and geometric configurations. This field of chemistry is therefore quite empirical and requires considerable trial and error experimentation. Compounds belonging to the same class will behave quite differently when subjected to the same conditions in attempting a resolution. This factor further complicates the desired separation of optically pure compounds. For example, it has been found that when a methyl group has been introduced into the naphthyl group of alpha-(beta-naphthyl)ethylamine, d-tartaric acid is ineffective in securing resolution. This failure of racemic compounds to follow a pattern is the rule rather than the exception.

The absence of predicability in optical resolutions of amines is illustrated by the fact that alpha-(beta-naphthyl)ethylamine has been successfully resolved by means of d-tartaric acid (Samuelsson, Chemical Abstracts, 18, 1833 (1924)) but the corresponding position isomer, alpha-(alpha-naphthyl)ethylamine, was not resolved with d-tartaric acid and only by resort to an expensive and unusual optically active acid, d-camphoric acid, was the resolution accomplished.

In the present invention, however, it has been found that racemic alpha-(alpha-naphthyl)ethylamine can be successfully resolved and both optical isomers can be recovered in pure form and at small cost by employing d-tartaric acid as the resolving agent. This result is accomplished by reacting dl-alpha-(alpha-naphthyl)ethylamine with 95% to 105% of the theoretical amount of d-tartaric acid in warm methanol solution at a temperature of 55° to 80° C. to produce dl-alpha-(alpha-naphthyl)ethylamine d-tartrate. The methanol solvent must be anhydrous or substantially anhydrous (not over 1–2% water). The crystalline d-alpha-(alpha-naphthyl)ethylamine d-tartrate crystallizes from the methanol solution at 55° C. or higher and can be separated from the methanol solution containing the more soluble l-alpha-(alpha-naphthyl)ethylamine d-tartrate. In the fractional crystallization, the temperatue of the solution should not be allowed to fall below 55° C., else the d-tartrate of the l-amine will also crystallize out and contaminate the d-amine d-tartrate. The crystalline d-alpha-(alpha-naphthyl)ethylamine d-tartrate can be further purified by recrystallization and the optically pure d-alpha-(alpha-naphthyl)ethylamine can be liberated therefrom without racemization by treatment with alkaline reagents.

To obtain the more soluble salt, l-alpha-(alpha-naphthyl)ethylamine d-tartrate, in crystalline form, the methanol is evaporated from the mother liquor and the salt taken up in water and subjected to further fractional crystallization. In this way, l-alpha-(alpha-naphthyl)-ethylamine d-tartrate is obtained in crystalline optically pure form. Upon treatment of the crystalline salt with aqueous alkali, such as dilute sodium or potassium hydroxide solution, l-alpha-(alpha-naphthyl)ethylamine in optically pure form is liberated without isomerization and can be isolated by extraction with an organic solvent.

The invention is disclosed in more detail by the following examples, which are provided for purposes of illustrating one embodiment of the invention. It will be readily understood by those skilled in the art that some modifications in conditions and relative amounts of the materials can be made without departing from the scope of the invention. Amounts of materials are given in parts by weight; temperatures are recorded in degrees centigrade.

Example 1 dl-Alpha-(alpha-naphthyl)ethylamine can be prepared from the corresponding ketone, alpha-acetonaphthone, by reductive amination at temperatures above 170° C. The method is illustrated below.

A solution of 340 parts of alpha-acetonaphthone (methyl alpha-naphthyl ketone) in 480 parts of methanol containing 100 parts of anhydrous ammonia is placed in an autoclave with 50 parts of Raney nickel catalyst. The mixture is heated to 175° C. after which hydrogen is admitted until the pressure is about 1000 lbs. per square inch. Agitation of the mixture and introduction of hydrogen is continued until no further absorption takes place (usually 3 to 4 hours). During the hydrogenation reaction the temperature may reach 190° to 200° C. The solution is decanted from the catalyst and distilled to remove methanol. The residue of dl-alpha-(alpha-naphthyl)ethylamine is distilled under vacuum and a yield of about 330 parts of amine assaying 95% primary amine are obtained.

Example 2

352 parts of dl-alpha-(alpha-naphthyl)ethylamine were added to a solution of 296 parts of d-tartaric acid in 4000 parts of commercial 99% to 100% methanol which had previously been heated to 50° C. The temperature increases to 60° to 65° C. Crystallization began immediately and when the temperature had fallen to 55° C. the crystals of d-alpha-(alpha-naphthyl)ethylamine d-tartrate were separated by filtration. The crystals were further purified by dissolving them in hot water (60° C. or higher) to form about a 10% solution and allowing the solution to cool slowly and precipitate crystals of amine salt. Crystallization from water was continued until the crystalline salt showed a constant optical rotation, indicating optical purity. The optically pure crystals were dissolved in water and treated with an excess of dilute sodium hydroxide solution. The oily layer of d-alpha-(alpha-naphthyl)ethylamine was separated, dried and distilled under reduced pressure. The pure amine had a specific rotation of +62° (c=5% in methanol).

The corresponding l-amine d-tartrate was recovered by evaporating the methanol from the mother liquor and recrystallizing the salt from hot water as described above for the d-amine d-tartrate. The purified salt was treated in aqueous solution with dilute alkali and the oily layer of l-alpha-(alpha-naphthyl)ethylamine was separated, dried and distilled under vacuum. The pure amine had a specific rotation of −62° (c=5% in methanol).

What is claimed as new and desired to be secured by Letters Patent of the United States is:

1. A method of resolving racemic alpha-(alpha-naphthyl)ethylamine into its optically active isomers which comprises dissolving dl-alpha-(alpha-naphthyl)ethylamine and d-tartaric acid in warm, substantially anhydrous methanol, cooling said solution to a temperature not lower than about 55° C. to cause the precipitation of d-alpha-(alpha-naphthyl)ethylamine d-tartrate, separating said d-alpha-(alpha-naphthyl)ethylamine d-tartrate, isolating l-alpha-(alpha-naphthyl)ethylamine d-tartrate from the mother liquor, and liberating d-alpha-(alpha-napthyl)ethylamine and l-alpha-(alpha-naphthyl)ethylamine from the respective salts of d-tartaric acid by reaction with alkali.

2. A method of producing d-alpha-(alpha-naphthyl)ethylamine from dl-alpha-(alpha-naphthyl)ethylamine which comprises forming dl-alpha-(alpha-naphthyl)ethylamine d-tartrate, fractionally crystallizing said salt from substantially anhydrous methanol at a temperature not lower than 55° C. separating the precipitate of d-alpha-(alpha-naphthyl)ethylamine d-tartrate, recrystallizing said precipitate from methanol until constant optical rotation is achieved, reacting said optically pure d-alpha-(alpha-naphthyl)ethylamine d-tartrate with aqueous alkali, and separating the d-alpha-(alpha-naphthyl)ethylamine thus liberated.

3. A method of producing l-alpha-(alpha-naphthyl)-ethylamine from dl-alpha-(alpha-naphthyl)ethylamine which comprises forming dl-alpha-(alpha-naphthyl)ethylamine d-tartrate, fractionally crystallizing said salt from substantially anhydrous methanol at a temperature not lower than 55° C., removing the precipitate of d-alpha-(alpha-naphthyl)ethylamine d-tartrate, isolating l-alpha-(alpha-naphthyl)ethylamine d-tartrate from the mother liquor, recrystallizing said l-alpha-(alpha-naphthyl)ethylamine d-tartrate from water until constant optical rotation is achieved, reacting said l-alpha-(alpha-naphthyl)-ethylamine d-tartrate with aqueous alkali, and separating the l-alpha-(alpha-naphthyl)ethylamine thus liberated.

4. A method of producing d-alpha-(alpha-naphthyl)-ethylamine which comprises dissolving dl-alpha-(alpha-naphthyl)ethylamine in a solution of d-tartaric acid in substantially anhydrous methanol at a temperature of at least 60° C., the amount of d-tartaric acid in said solution being at least 95% of the stoichiometric amount calculated on the amount of dl-alpha-(alpha-naphthyl)-ethylamine, cooling said solution to a temperature not lower than 55° C. to cause fractional crystallization of d-alpha-(alpha-naphthyl)ethylamine d-tartrate, separating said d-alpha-(alpha-naphthyl)ethylamine d-tartrate from the mother liquor, recrystallizing said salt from substantially anhydrous methanol until constant optical rotation is achieved, reacting said salt with aqueous alkali, and separating the d-alpha-(alpha-naphthyl)ethylamine thus liberated.

References Cited in the file of this patent

UNITED STATES PATENTS 2,820,827     Ruschig et al.     Jan. 21, 1958

OTHER REFERENCES

Samuelsson: Svensk Kemisk Tidskrift, volume 34, pages 7–12 (1922) [No. 1].

Samuelsson: Chemical Abstracts, volume 18, pages 1833 and 1834 (1924).

Elsevier's Encyclopedia of Organic Chemistry, volume 12B, pages 424–425, Series III (1949).